United States Patent [19]

Caputo

[11] Patent Number: 4,507,607
[45] Date of Patent: Mar. 26, 1985

[54] ANGULAR ACCELEROMETER

[75] Inventor: William R. Caputo, Wyckoff, N.J.

[73] Assignee: Westinghouse Electric Corp., Pittsburgh, Pa.

[21] Appl. No.: 387,301

[22] Filed: Jun. 10, 1982

[51] Int. Cl.³ .......................... G01D 3/48; G01D 3/54
[52] U.S. Cl. ...................................................... 324/164
[58] Field of Search ............... 318/616, 651; 310/329, 310/168, 169; 187/29 R; 324/164, 162, 160

[56] References Cited

U.S. PATENT DOCUMENTS

| 2,090,521 | 8/1937 | Serrell | 324/164 X |
| 3,178,641 | 4/1965 | Varterasian | 324/164 |
| 4,441,077 | 4/1984 | Dodgen | 324/164 |

FOREIGN PATENT DOCUMENTS

| 1201587 | 9/1965 | Fed. Rep. of Germany | 324/164 |
| 1209780 | 7/1966 | Fed. Rep. of Germany | 324/164 |
| 1266033 | 4/1968 | Fed. Rep. of Germany | 324/164 |
| 1512118 | 5/1978 | United Kingdom | 324/164 |

OTHER PUBLICATIONS

Kripl, "Brushless Tachometer System", IBM Tech. Disclosure Bulletin, vol. 16, No. 1, pp. 237-238, Jun. 1973.

Primary Examiner—Michael J. Tokar
Assistant Examiner—Jose M. Solis
Attorney, Agent, or Firm—D. R. Lackey

[57] ABSTRACT

An angular accelerometer which generates a directly usable signal in stationary coils proportional to the instantaneous acceleration rate of a rotating element. Errors due to wobble, eccentricity and non-homogeneity of the rotating element are reduced by a symmetrical generation of flux which links the element, and a symmetrical detection of flux produced by current flow in the element.

8 Claims, 6 Drawing Figures

ANGULAR ACCELEROMETER

BACKGROUND OF THE INVENTION

1. Field of the Invention

The invention relates in general to accelerometers, and more specifically to angular accelerometers for developing a signal representative of the instantaneous acceleration of a rotating shaft.

1. Description of the Prior Art

Traction elevator systems suspend the elevator car on a plurality of wire ropes which pass over a traction sheave and are connected to a counterweight. The traction sheave is usually driven by an electrical drive motor, such as an A.C. induction motor via a reduction gear, or a D.C. motor, either directly or via a reduction gear, depending upon the contract speed of the elevator.

The mechanical system of the traction elevator, which consists of all rotational and translational inertia and cable spring compliance, behaves as a resonant system with very little damping. The oscillation frequency of the mechanical system ranges between about 3 and 15 hertz, and is a function of the aforesaid parameters, as well as the load in the elevator car, and the position and speed of the elevator car. Anything that perturbs the mechanical system at its resonant frequency can cause an annoying vertical oscillation of the elevator car, referred to as jitter.

A source of the perturbance, which may be produced with either a motor generator voltage source, or a static converter voltage source, is due to the relationship between the poles and other mechanical structure of the motor, the motor speed, and drive sheave diameter. The output torque of the motor may be inherently perturbed due to its structure a predetermined number of times for each revolution of the motor, which for a predetermined motor speed and sheave diameter may translate to a perturbance frequency in the resonant frequency range of the mechanical system.

Another source of the perturbance may occur in those elevator systems in which the source of the adjustable direct current voltage is a static dual bridge converter. During bank reversal, a sudden torque change in the output shaft of the drive motor due to an abrupt armature current change may shock the mechanical system into resonance.

Jitter may be caused by electrical noise in the stabilizing signal applied to the velocity error signal in the control loop which determines the magnitude of the direct current voltage applied to the drive motor.

High speed elevator systems driven by a direct current motor, with a tachometer as the velocity feedback control element to control the velocity of the elevator car, require stabilization means in order to achieve a smooth response.

The derivature of the drive motor armature voltage, or the derivative of the counter emf developed by the armature of the drive motor, may be used as the stabilizing signal.

The ripple frequencies in these voltages must be filtered out. The filtering, however, is not without its perils, as filtering the high frequency alternating component may actually cause instability. In addition, filtering reduces the bandwidth and effectiveness of the signal.

The stabilizing signal may also be provided by taking the derivative of a tachometer voltage, which may be used to provide the velocity signal. Tachometers, however, produce electrical noise in their output signals due to slots, commutator bars, brushes, imperfections in construction, and the gearing or belting of the drive coupling. Differentiation of the tachometer signal to develop a signal proportional to acceleration accentuates the noise. This electrical noise appears as an unwanted addition to the command signal. The elevator car is capable of responding to this electrical noise in the signal at low frequencies, particularly at the system resonance frequency.

The electrical noise in a tachometer arrangement may be reduced by using a very high quality, low ripple tachometer, such as 2% maximum ripple peak-to-peak, and using a rim drive instead of a belt drive. In a rim drive, the tachometer has a roller on its drive shaft which is frictionally driven by a rotating element, such as the motor shaft, or the drive sheave, of an elevator system. Even this signal, however, must be low pass filtered, which reduces its bandwidth and effectiveness. Slippage between the roller of the tachometer and the driving element could be a problem, with U.S. Pat. No. 4,085,823, which is assigned to the same assignee as the present application, describing self-checking circuits which may be used to detect slippage.

My U.S. Pat. No. 3,749,204 discloses an acceleration transducer for providing a stabilizing signal. A disadvantage of the acceleration transducer arrangement is that a variable amount of armature voltage feedback, (a parasitic signal in this case) is an integral part of the signal. The variability is due to the change in armature inductance with field strength and to armature resistance with temperature. The stabilizing signal provides some jitter suppression, but the required amount sometimes cannot be used because the system can become unstable at some higher frequency due to the parasitic signal.

My U.S. Pat No. 4,030,570 discloses developing stabilization via two feedback signals, with one being obtained by differentiating the output of a high quality, rim driven tachometer, and another by differentiating and then integrating the signal from such a tachometer.

Considering the present state of the art, the best approach for the development of stabilization signals appears to be the use of the high quality, low ripple tachometer, notwithstanding its relatively high cost.

SUMMARY OF THE INVENTION

Briefly, the present invention is a new and improved angular accelerometer which is rugged, and may be easily manufactured using low cost components. Reproducible results from accelerometer to accelerometer are easily achievable using normal manufacturing tolerances, as the unique construction reduces errors due to eccentricity, wobble, and non-homogeneity of the single rotating element, which is in the form of a flat, thin disc. Opposing sets of magnetic flux producing elements and pick-up coils are disposed on opposite sides of the disc. The magnetic flux producing elements produce a flux pattern through the disc, and induces voltages therein proportional to the rotational speed of the disc. The resulting currents produce magnetic flux which induce voltages into the pick-up coils. The pick-up coils are symmetrically arranged about the rotational axis, with the voltages induced into the pick-up coils being proportional to the rate of change of the flux produced by the disc currents, and thus the voltages are proportional to the rate of change of the disc rotational speed. The voltages produced by the pick-up coils are summed to provide a signal which is directly usable as an acceleration signal, such as in the current control loop of an elevator system, as hereinbefore described.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
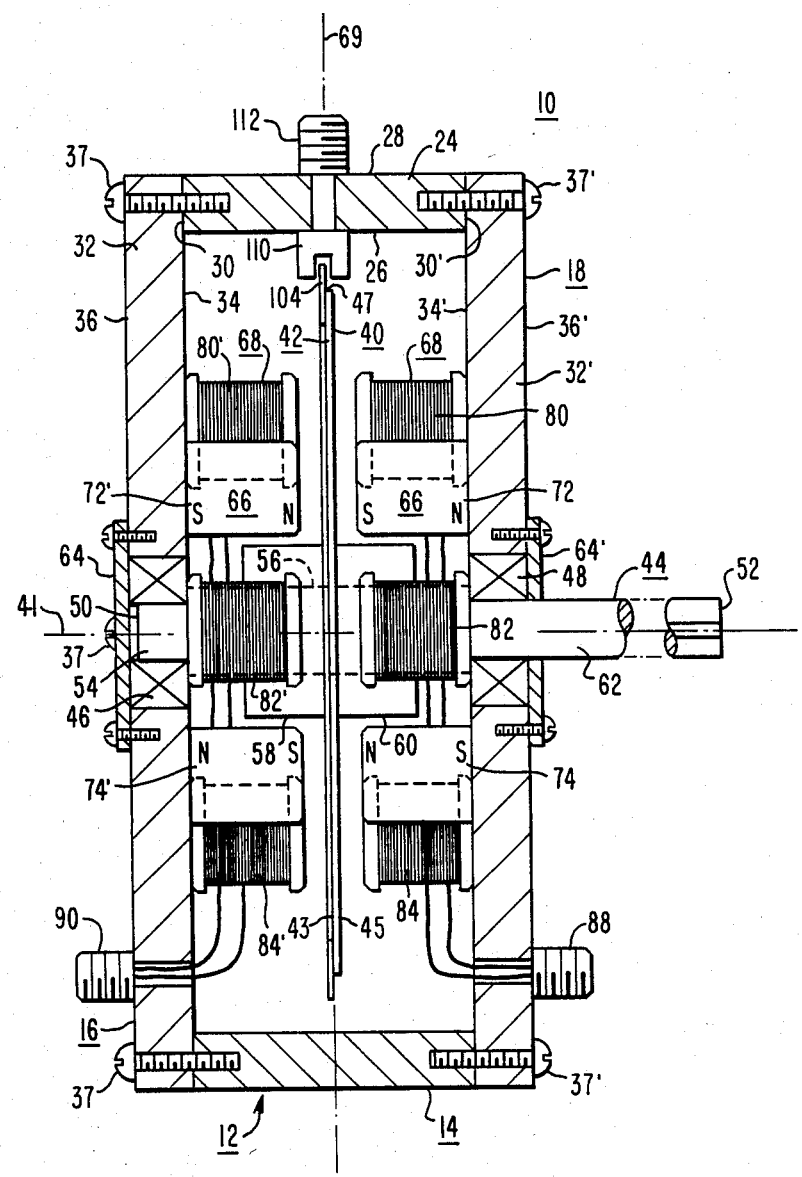
FIG. 1 is an elevational view, partially in section, of an angular accelerometer constructed according to the teachings of the invention.
Figure 2:
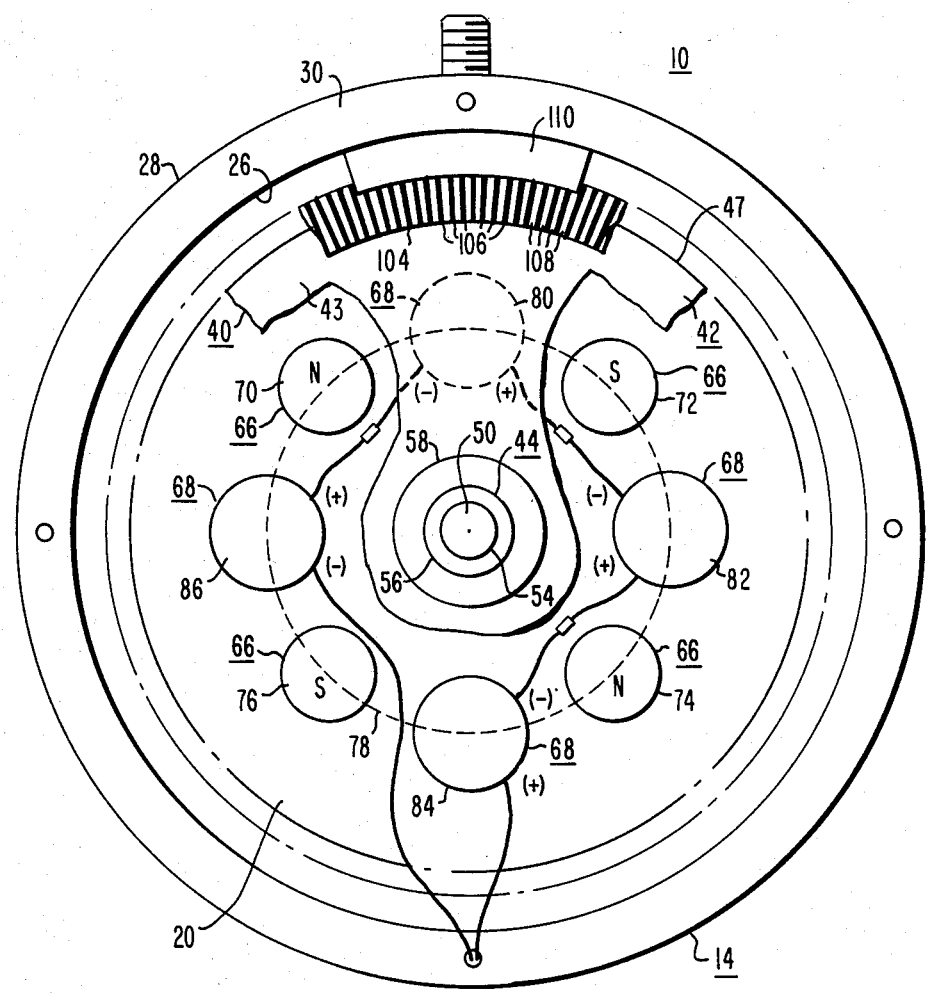
FIG. 2 is a left end elevational view of the angular accelerometer shown in FIG. 1, with the cover removed, and with the rotor element shown partially cut away.

Referring now to the drawings, and to FIGS. 1 and 2 in particular, there is shown an angular accelerometer 10 constructed according to the teachings of the invention. FIG. 1 is an elevational view, shown partially in section, of accelerometer 10. Accelerometer 10 includes a magnetic housing, casing or enclosure 12, constructed of mild steel, which functions as a flux path for the desired or operative magnetic fluxes, and also as a shield to prevent external magnetic fields from linking elements disposed within the enclosure 12.

The exemplary embodiment of enclosure 12 shown in FIG. 1, illustrates the enclosure 12 being formed of first, second, and third cooperative elements 14, 16, and 18, respectively, with the first element 14 being ring-shaped, and with the second and third elements 16 and 18 being in the form of flat discs which function as covers for the first element 14. The second and third elements 16 and 18 will hereinafter be referred to as covers 16 and 18.

The first element 14 of enclosure 12 includes a body portion 24, which may be circular in configuration, as illustrated, having inner and outer surfaces 26 and 28, respectively. The outwardly extending ends of body portion 24 define flat surfaces 30 and 30' for receiving covers 16 and 18, respectively.

Covers 16 include flat, disc-shaped members 32 and 32', respectively, with member 32 having first and second major, flat, parallel surfaces 34 and 36, respectively, and with member 32 having flat, parallel surfaces 34' and 36'. Surfaces 34 and 34' are inner surfaces, when covers 16 and 18 are assembled with the first element 14, and surfaces 36 and 36' are external surfaces of the assembly. A plurality of screws 37 and 37' may secure covers 16 and 18 to surfaces 30 and 30' respectively.

Angular accelerometer 10 includes an electro-conductive rotor element or armature 40 journaled for rotation within enclosure 12 on a rotational axis 41. Armature 40 includes a relatively thin, flat disc 42 mounted on, but electrically isolated from, a shaft 44. Disc 42 has first and second major, flat, parallel surfaces 43 and 45, respectively, an outer edge or periphery 47 and an inner edge 49. Copper having a thickness dimension of about 0.150 inch, and a diameter of about 6 inches, may be used for the disc 42. Aluminum would also be suitable.

Shaft 44, which may be formed of steel, is rotatively supported by first and second bearings 46 and 48, respectively, which are mounted in, or carried by covers 16 and 18, respectively.

Shaft 44, which has first and second ends 50 and 52, respectively, has a first surface 54 adjacent to end 50 which defines a first diameter sized to snugly enter bearing 46. Shaft 44 then steps outwardly to a larger diameter defined by a second surface 56, which surface receives the disc 42 and first and second support members 58 and 60, respectively. Support members 58 and 60 are disposed on opposite sides of disc 42, tightly against surfaces 43 and 45, respectively, to align and hold the major flat surfaces 43 and 45 of disc 42 perpendicular to the longitudinal rotational axis 41. Members 58 and 60 are formed of a non-magnetic, non-conductive material, such as a suitable plastic. Shaft 44 then steps inwardly from surface 56 to surface 62, with surface 62 defining a diameter sized to snugly enter bearing 48. Shaft 44 then extends outside enclosure 12, with end 52 being adapted for direct coupling to a shaft whose acceleration is to be monitored, e.g., the drive motor shaft of an elevator drive motor. Removable retainer plates 64 and 64' cover bearings 46 and 48, respectively. This completes the rotatable portion of the angular accelerometer 10. It is important to note that their are no brushes, modulators/demodulators, delicate radially moving masses, or other components susceptible to wear, calibration, or other types of failure.

Angular accelerometer 10 includes a stationary portion within enclosure 12, with the stationary portion including flux means 66 and pick up coil means 68. The flux means 66 generates a magnetic flux which links disc 42, with the flux pattern being symmetrical about the rotational axis 41. The pick-up coil means 68 is also symmetrically arranged about the rotational axis 41, and also about an imaginary plane 69 disposed perpendicular to axis 41, through a line which bisects the width of disc 42. The symmetrical arrangement of the flux means 66 and pick-up coil means 68 is highly important, as it reduces errors due to wobble, eccentricity, and non-homogeneity of the disc 42. Thus, an accurate, reproducible accelerometer may be manufactured, using normal manufacturing and assembly tolerances.

In general, the flux means 66 includes a plurality of permanent magnets arranged in a plurality of pairs, with the permanent magnets of each pair being aligned on a common longitudinal axis, and with the adjacent ends of the aligned permanent magnets being spaced apart by a predetermined dimension, such as about 0.25 inch. In like manner, the pick-up coil means 68 includes a plurality of pick-up coils arranged in a plurality of pairs, with the pick-up coils of each pair being aligned on a common longitudinal axis, and with their adjacent ends being spaced apart by the same predetermined dimension. The disc 42 is disposed in the space between the spaced elements of each pair. In other words, the permanent magnets and pick-up coils are arranged in two opposing sets, with one set being on each side of disc 42.

More specifically, flux means 66, in a preferred embodiment, includes eight permanent magnets, four on each side of disc 42, and pick-up coil means 68 includes eight pick-up coils, four on each side of disc 42. FIG. 2 is a left end elevational view of the angular accelerometer 10 shown in FIG. 1, with cover 16 removed, and with parts of disc 42 cut away in order to illustrate the first set of permanent magnets and pick-up coils. It is not necessary to show the second or opposing set in detail, as a right end elevational view of the second set would appear exactly the same as the first set shown in FIG. 2. The first set is attached to surface 34' of cover 18, by any suitable means, such as screws, and the second set is attached to surface 34 of cover 16, by similar mounting means. As illustrated in FIG. 2, the first set of magnets and pick-up coils includes four permanent magnets 70, 72, 74 and 76, disposed in a planetary arrangement with their longitudinal axes on a common circle 78 whose center coincides with the rotational axis 41. The magnet centers are spaced 90° apart on this circle. The first set further includes four pick-up coils 80, 82, 84 and 86 disposed with their longitudinal axes on circle 78, with the pick-up coils each being disposed in a space between two adjacent magnets. Thus, the centers of the pick-up coil are spaced 90° from one another, and 45° from the centers of the adjacent permanent magnets. The pick-up coils each include an electrical winding having a predetermined number of turns, such as a winding disposed on a bobbin, and the winding assembly is disposed about a magnetic core, such as a mild steel pole piece. The polar orientations of the permanent magnets 70, 72, 74 and 76 are alternated as they proceed about the circle 78. Thus, permanent magnets 70 and 74 may have north poles facing disc 42, while permanent magnets 72 and 76 have south poles facing disc 42. Each element of the first set is aligned with an element of the second set, with permanent magnets being aligned with permanent magnets, and pick-up coils aligned with pick-up coils. Thus, the elements of the second set are given the same reference numeral as the aligned element of the first set, except for a prime mark. It should be noted that while a left end view of the first set, shown in FIG. 2, appears the same as the right end view of the second set, that when the two sets face one another, the facing ends of aligned magnets are of opposite polarity.

The coils of the sets are electrically connected in series. The coils of the first set may be electrically connected in series to a terminal 88, such as a terminal for receiving a shielded coaxial cable, and the coils of the second set may be connected in series to a similar terminal 90. With this arrangement, the signals from the two terminals are then electrically connected in series outside the enclosure 12. This dual terminal arrangement simplifies the assembly of accelerometer 10, as there are no internal electrical connections between the two sets. However, all eight coils may be electrically connected in series within enclosure 12 to a single terminal, if desired.

Figure 3:
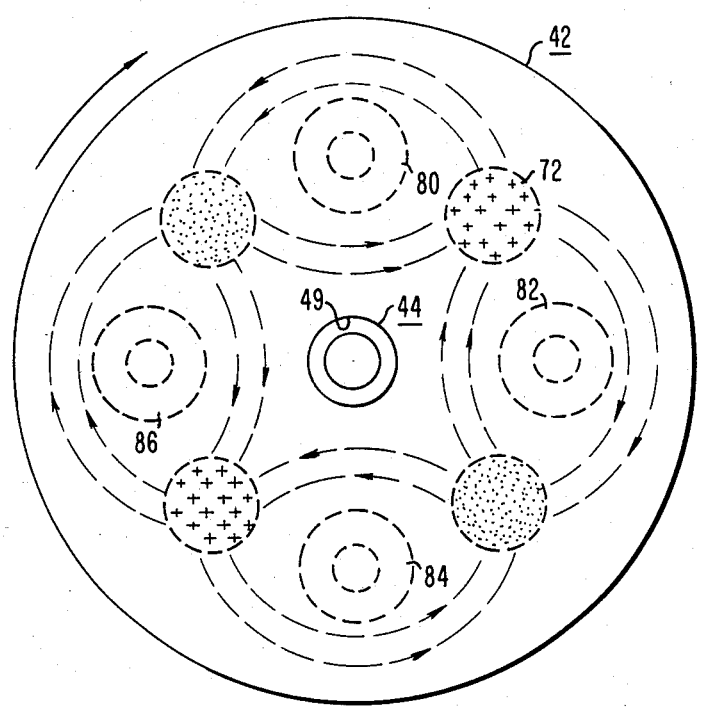
FIG. 3 is a diagrammatic view of the rotor element illustrating the induced current flow in the rotor element due to the rotation of the element in the magnetic field of the permanent magnets.

In operation, magnetic flux from the opposing permanent magnets links disc 42. When disc 42 is stationary, no voltages are induced into the disc, and no voltages are generated in the pick-up coils. When shaft 44 is rotated from zero rpm to a predetermined constant rpm, voltages are induced into the disc 42, which produce currents as shown in FIG. 3. FIG. 3 is a left end view of disc 42, similar to the fragmentary view of disc 42 shown in FIG. 2. The induced voltages and resulting currents change in proportion to changing disc speed, as the disc 42 is accelerated. The magnetic flux produced by the circulating currents flows through the magnetic paths defined by the magnetic material of the enclosure 12, and the magnetic cores upon which the windings of the pick-up coils are disposed. A changing magnetic flux linking a pick-up coil induces a voltage into the coil, which voltage is summed with the induced voltages of all of the other pick-up coils, to produce a voltage which is directly proportional to the rate at which the flux is changing, which rate is directly proportional to the rate at which the angular velocity is changing. When the angular velocity reaches the predetermined constant rpm, the disc voltages and currents are constant, and the flux which links the pick-up coils is constant. Thus, at constant rpm, no voltages are induced into the pick-up coils. When the shaft is then decelerated, the pick-up coils will again provide an output signal proportional to the instantaneous deceleration rate of the shaft.

FIG. 3 illustrates that the preferred embodiment produces a symmetrical current flow and thus a symmetrical flux arrangement, which is necessary in order to reduce the effects of wobble, eccentricity and non-homogeneity. Other symmetrical arrangements may be used, but to produce the symmetry of the preferred embodiment, going to the next higher number of magnets and coils, would require 12 magnets and 12 coils.

Figure 5:
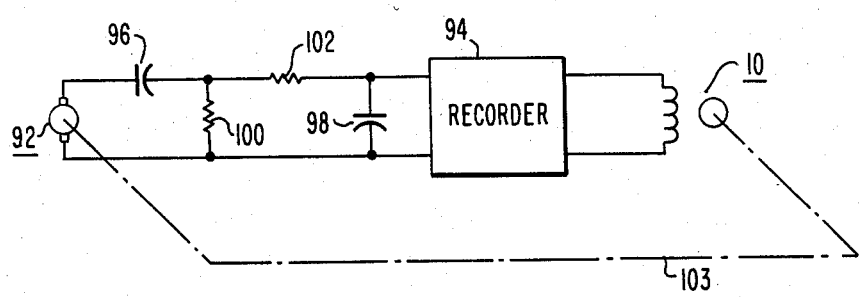
FIG. 5 is a schematic diagram which illustrates how the graphs shown in FIGS. 4A and 4B were generated.
Figure 4A:
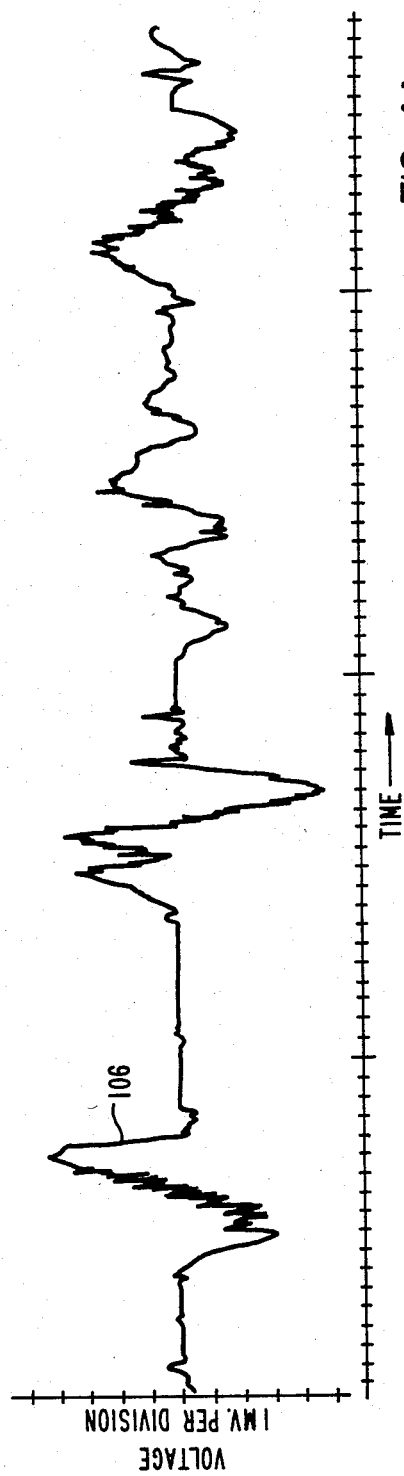
FIGS. 4A and 4B are graphs which compare the output of an angular accelerometer constructed according to the teachings of the invention, with the differentiated output of a high quality, 2% maximum ripple tachometer, with both being driven by a common shaft.
Figure 4B:
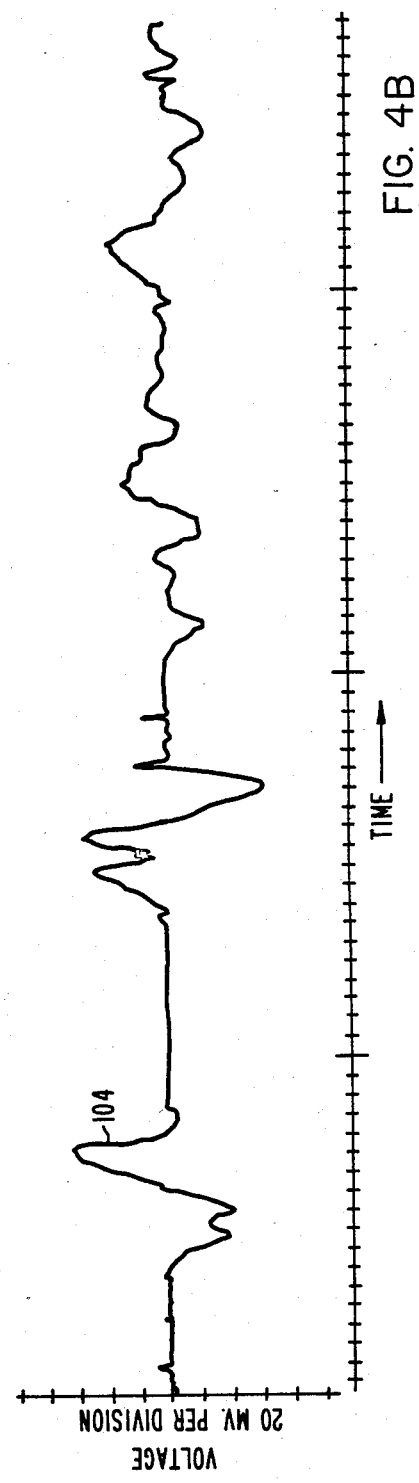

FIGS. 4A and 4B are graphs which compare the output of an angular accelerometer constructed according to the teachings of the invention, with the differentiated output of a high quality, 2% maximum ripple tachometer. FIG. 5 is a schematic diagram which illustrates the arrangement used for generating the output signals. The output of the angular accelerometer was directly applied to a recorder 94, while the output of a tachometer 92 was differentiated and filtered, to obtain a signal proportional to acceleration. Capacitors 96 and 98 and resistors 100 and 102 were used to differentiate and filter the tachometer output, with capacitors 96 and 98 being 1 $\mu$f and 0.22 $\mu$f, respectively, and resistors 100 and 102 being 1 K and 75 K ohms, respectively. Curves 104 and 106 are the recorded outputs of accelerometer 10 and tachometer 92, respectively, with these curves being recorded while the angular accelerometer 10 and tachometer 92 were driven from a common shaft 103. It will be noted that the angular accelerometer of the invention produces a much smoother signal, with very little ripple or electrical noise in the waveform. The output of accelerometer 10 was about twenty times the output of tachometer 92, which provides a good signal-to-noise ratio.

Using permanent magnets constructed of Alnico 8 having a diameter of about 0.6 inches, and a length of about 0.6 inches, and with each pick-up coil having about 1000 turns, the output voltage is about 5 mv. per radian per sec$^2$, which is equivalent to the output of a stabilizing transformer now used to develop an acceleration feedback signal. With eight pick-up coils, the signal to noise ratio is excellent, and the signal may be easily amplified.

In order to compensate for environmental temperature changes, a surface film-type heater and thermostat may be used to maintain a constant temperature, and thus reduce temperature caused errors.

FIGS. 1 and 2 illustrate how the angular accelerometer 10 of the invention lends itself to also being used as a digital tachometer. An optical, washer-shaped disc 104 may be attached to one of the sides of disc 42, such that disc 104 extends uniformly outward from edge 47 of the disc 42. Optical disc 104 may be formed of transparent polyester film, for example. A pattern of spaced, opaque lines 106, which are as wide as the spacing 108 between them, which may be 0.010 inch, for example, are disposed about optical disc 104. The lines 106 are aligned with the rotational center 41. An optical reader 110 contains two pairs of light-emitting diodes and photo-transistors. The pairs are arranged such that when one pair is aligned with the center of an opaque line, the other pair is aligned with the edge of an opaque line, which provides a 90° displacement for a two phase reader. This arrangement provides rotational direction information, as well as speed (pulse rate information). A suitable logic circuit for indicating direction from such an arrangement is shown in U.S. Pat. No. 4,433,756 which is assigned to the same assignee as the present application. The pulses from the two reader pairs are delivered to a terminal 112, such as a terminal for receiving a coaxial cable.

In summary, there has been disclosed a new and improved angular accelerometer which is rugged, simple in structure, and easily manufactured using normal manufacturing tolerances. The rotating element is simply a flat disc, with a signal directly proportional to shaft acceleration being developed in stationary coils. The symmetrical generation of magnetic flux and the symmetrical arrangement of the pick-up coils cancels errors due to manufacturing tolerances, and assures that accelerometers which provide an accurate, predictable output may be reproduced using production line techniques.

I claim as my invention:

1. An angular accelerometer, comprising:

a stationary housing formed of magnetic material, an electroconductive armature in said housing, journaled for rotation about a rotational axis, said armature being symmetrical about a bisecting plane disposed perpendicular to said rotational axis, flux means in said housing for generating magnetic flux which links said armature in a pattern symmetrical about said rotational axis, said flux means including a plurality of pairs of permanent magnets, with the permanent magnets of each pair being spaced to provide an air gap between them in which the electroconductive armature is located, pick-up coil means in said housing symmetrically arranged about said rotational axis, on both sides of said bisecting plane, means accessible outside said housing for rotating said armature, and terminal means accessible outside said housing connected to said pick-up coil means, with said pick-up coil means providing a voltage when said armature is rotated having a magnitude proportional to the instantaneous acceleration rate of said armature.

2. An angular accelerometer, comprising:

a stationary housing formed of magnetic material, an electroconductive armature in said housing, journaled for rotation about a rotational axis, said armature being symmetrical about a bisecting plane disposed perpendicular to said rotational axis, flux means in said housing for generating magnetic flux which links said armature in a pattern symmetrical about said rotational axis, pick-up coil means in said housing symmetrically arranged about said rotational axis, on both sides of said bisecting plane, means accessible outside said housing for rotating said armature, terminal means accessible outside said housing connected to said pick-up coil means, with said pick-up coil means providing a voltage when said armature is rotated having a magnitude proportional to the instantaneous acceleration rate of said armature, marker means on the armature, and detector means for detecting the marker means, with said detector means providing a signal proportional to the angular velocity of the armature.

3. An angular accelerometer, comprising:

a stationary housing formed of magnetic material, an electroconductive armature in said housing, journaled for rotation about a rotational axis, said armature being symmetrical about a bisecting plane disposed perpendicular to said rotational axis, flux means in said housing for generating magnetic flux which links said armature in a pattern symmetrical about said rotational axis, said flux means including first, second, third and fourth pairs of spaced permanent magnets, with the pairs being disposed 90° from one another, about the rotational axis, pick-up coil means in said housing symmetrically arranged about said rotational axis, on both sides of said bisecting plane, means accessible outside said housing for rotating said armature, and terminal means accessible outside said housing connected to said pick-up coil means, with said pick-up coil means providing a voltage when said armature is rotated having a magnitude proportional to the instantaneous acceleration rate of said armature.

4. The angular accelerometer of claim 3 wherein the first and third pairs are of like polar orientation, opposite to the polar orientation of the second and fourth pairs.

5. An angular accelerometer, comprising:

a stationary housing formed of magnetic material, an electroconductive armature in said housing, journaled for rotation about a rotational axis, said armature being symmetrical about a bisecting plane disposed perpendicular to said rotational axis, flux means in said housing for generating magnetic flux which links said armature in a pattern symmetrical about said rotational axis, pick-up coil means in said housing symmetrically arranged about said rotational axis, on both sides of said bisecting plane, said pick-up coil means including magnetic cores attached to the housing, and electrical coils disposed in inductive relation with said magnetic cores, with the flux path for the magnetic flux generated by currents in the armature including the housing and said magnetic cores, means accessible outside said housing for rotating said armature, and terminal means accessible outside said housing connected to said pick-up coil means, with said pick-up coil means providing a voltage when said armature is rotated having a magnitude proportional to the instantaneous acceleration rate of said armature.

6. An angular accelerometer, comprising:
a stationary housing formed of magnetic material,
an electroconductive armature in said housing, journaled for rotation about a rotational axis, said armature being symmetrical about a bisecting plane disposed perpendicular to said rotational axis,
flux means in said housing for generating magnetic flux which links said armature in a pattern symmetrical about said rotational axis,
pick-up coil means in said housing symmetrically arranged about said rotational axis, on both sides of said bisecting plane, said flux means including a plurality of pairs of permanent magnets, and said pick-up coil means including a plurality of pairs of pick-up coils, with the pairs of permanent magnets and pairs of pick-up coils being alternately arranged about the rotational axis,
means accessible outside said housing for rotating said armature,
and terminal means accessible outside said housing connected to said pick-up coil means,
with said pick-up coil means providing a voltage when said armature is rotated having a magnitude proportional to the instantaneous acceleration rate of said armature.

7. The angular accelerometer of claim 6 wherein the flux means and pick-up coil means each includes four pairs, with adjacent pairs being 45° apart, about the rotational axis.

8. An angular accelerometer, comprising:
a stationary housing formed of magnetic material,
an electroconductive armature in said housing, journaled for rotation about a rotational axis, said armature being symmetrical about a bisecting plane disposed perpendicular to said rotational axis,
flux means in said housing for generating magnetic flux which links said armature in a pattern symmetrical about said rotational axis,
pick-up coil means in said housing symmetrically arranged about said rotational axis, on both sides of said bisecting plane,
means accessible outside said housing for rotating said armature,
and terminal means accessible outside said housing connected to said pick-up coil means, said pick-up coil means including a plurality of electrical windings connected in electrical series to said terminal means,
with said pick-up coil means providing a voltage when said armature is rotated having a magnitude proportional to the instantaneous acceleration rate of said armature.

* * * * *